(12) United States Patent
Kleppe et al.

(10) Patent No.: US 11,372,223 B2
(45) Date of Patent: *Jun. 28, 2022

(54) HIGH-RESOLUTION SCANNING MICROSCOPY

(71) Applicant: CARL ZEISS MICROSCOPY GmbH, Jena (DE)

(72) Inventors: Ingo Kleppe, Jena (DE); Yauheni Novikau, Jena (DE); Christoph Nieten, Jena (DE); Ralf Netz, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/357,869

(22) Filed: Mar. 19, 2019

(65) Prior Publication Data
US 2019/0258042 A1 Aug. 22, 2019

Related U.S. Application Data

(63) Continuation of application No. 14/457,833, filed on Aug. 12, 2014.

(30) Foreign Application Priority Data

Aug. 15, 2013 (DE) .......................... 102013013792.6
Nov. 15, 2013 (DE) .......................... 102013019347.8

(51) Int. Cl.
G02B 21/00 (2006.01)
G02B 15/14 (2006.01)
(Continued)

(52) U.S. Cl.
CPC ........... G02B 21/0072 (2013.01); G02B 6/08 (2013.01); G02B 15/142 (2019.08);
(Continued)

(58) Field of Classification Search
CPC .............. G02B 21/0072; G02B 21/008; G02B 21/0032; G02B 21/0076; G02B 21/361;
(Continued)

(56) References Cited

U.S. PATENT DOCUMENTS 5,532,873 A * 7/1996 Dixon ................ G02B 21/0044
359/368
7,298,476 B2 * 11/2007 Tsai ....................... B82Y 15/00
250/458.1

(Continued)

FOREIGN PATENT DOCUMENTS

CA 2749622 A1 * 7/2010 ........... A61B 3/1025
DE 19951482 A1 5/2001
(Continued)

OTHER PUBLICATIONS

Muller, Claus B., et al., "Image Scanning Microscopy", Physical Review Letters 2010; 104(19):198101-1-198101-4.
(Continued)

Primary Examiner — Alison Slater
(74) Attorney, Agent, or Firm — Duane Morris LLP

(57) ABSTRACT

A microscope and method for high resolution scanning microscopy of a sample, having an illumination device, an imaging device for the purpose of scanning at least one point or linear spot across the sample and of imaging the point or linear spot into a diffraction-limited, static single image below a reproduction scale in a detection plane. A detector device is used for detecting the single image in the detection plane for various scan positions, with a location accuracy which, taking into account the reproduction scale in at least one dimension/measurement, is at least twice as high as a full width at half maximum of the diffraction-limited single image.

26 Claims, 10 Drawing Sheets

Related U.S. Application Data

(60) Provisional application No. 62/025,649, filed on Jul. 17, 2014.

(51) Int. Cl.
*G02B 21/36* (2006.01)
*G02B 6/08* (2006.01)
*H04N 7/18* (2006.01)

(52) U.S. Cl.
CPC ........ *G02B 21/008* (2013.01); *G02B 21/0032* (2013.01); *G02B 21/0076* (2013.01); *G02B 21/361* (2013.01); *H04N 7/183* (2013.01)

(58) Field of Classification Search
CPC .......... G02B 27/58; G02B 6/06; G02B 21/06; G02B 21/367; G02B 21/025; G02B 26/0833; G02B 6/08; G02B 21/002; G02B 26/0816; G02B 15/142; G02B 15/14; G06N 20/00; G06N 3/006; G06N 3/02; G06N 3/0445; G06N 3/0454; G06N 3/0472; G06N 3/084; G06N 3/088; G06N 3/126; G06N 5/046; G06N 7/005; G06N 3/0635; G05B 13/028; G05B 19/4183; G05B 19/4184; G05B 19/41845; G05B 19/4185; H04N 7/183
See application file for complete search history.

(56) References Cited

U.S. PATENT DOCUMENTS

| | | | | |
|---|---|---|---|---|
| 7,636,158 B1* | 12/2009 | Pawluczyk | ............... | G01J 3/02 356/326 |
| 8,055,042 B2* | 11/2011 | Soenksen | ............. | G02B 21/002 382/128 |
| 8,389,893 B2* | 3/2013 | Kempe | ................ | B23K 26/046 219/121.67 |
| 9,404,867 B2* | 8/2016 | Kempe | ................ | G02B 21/16 |
| 9,632,296 B2* | 4/2017 | Wolleschensky | .... | G02B 21/002 |
| 9,791,686 B2* | 10/2017 | Wolleschensky | .... | G02B 21/002 |
| 2005/0264776 A1* | 12/2005 | Baer | ................. | A45D 26/0014 355/43 |
| 2007/0057211 A1 | 3/2007 | Bahlman et al. | | |
| 2007/0096038 A1* | 5/2007 | Tsai | ................. | B82Y 15/00 250/458.1 |
| 2008/0136742 A1* | 6/2008 | Tegreene | .......... | G02B 27/0031 345/7 |
| 2009/0141126 A1* | 6/2009 | Soenksen | ........... | H04N 5/23206 348/79 |
| 2010/0294749 A1* | 11/2010 | Kempe | ................ | B23K 26/046 219/121.72 |
| 2011/0064296 A1* | 3/2011 | Dixon | ................. | G02B 21/16 382/133 |
| 2011/0285995 A1* | 11/2011 | Tkaczyk | ................ | G01J 3/021 356/326 |
| 2012/0019821 A1* | 1/2012 | Chen | ................. | G02B 21/0032 356/303 |
| 2012/0140057 A1* | 6/2012 | Borck | ............... | G01N 21/6458 348/79 |
| 2012/0166128 A1* | 6/2012 | Ikhlef | ..................... | G01T 7/005 702/104 |
| 2012/0319007 A1* | 12/2012 | Kempe | ............. | G01N 21/6458 250/459.1 |
| 2013/0135715 A1 | 5/2013 | Chen et al. | | |
| 2013/0155499 A1* | 6/2013 | Dixon | ................... | G02B 21/06 359/385 |
| 2013/0342674 A1* | 12/2013 | Dixon | ................... | G02B 21/36 348/79 |
| 2014/0104618 A1* | 4/2014 | Potsaid | ............. | G01B 9/02055 356/497 |
| 2015/0008309 A1* | 1/2015 | Wolleschensky | .... | G02B 21/002 250/208.1 |
| 2015/0015879 A1* | 1/2015 | Papadopoulos | ...... | G02B 6/0288 356/301 |
| 2015/0054921 A1* | 2/2015 | Dixon | ................. | G02B 21/006 348/46 |
| 2015/0109432 A1* | 4/2015 | Dixon | ................. | G02B 21/008 348/79 |
| 2016/0088205 A1* | 3/2016 | Horstmeyer | ......... | H04N 5/2256 348/80 |

FOREIGN PATENT DOCUMENTS

| | | | |
|---|---|---|---|
| DE | 102006021317 B3 | 10/2007 | |
| DE | 102012204128 A1 | 9/2013 | |
| EP | 1 157 297 B1 | 11/2002 | |
| EP | 2 317 362 A1 | 5/2011 | |
| JP | H0442117 A | 2/1992 | |
| WO | 2006127692 A2 | 11/2006 | |
| WO | WO-2012126718 A1 * | 9/2012 | ............ G01B 11/24 |
| WO | 2013135487 A1 | 9/2013 | |

OTHER PUBLICATIONS

Gong, Wei, et al., "Improved spatial resolution in fluorescence focal modulation microscopy", Optics Letters 2009; 34(22):3508-3510.
Sheppard, C.J.R.; "Super-resolution in Confocal Imaging"; Optik 80 1988; 2:53-54.
Sarder, Pinaki, et al., "Deconvolution Methods for 3-D Fluorescence Microscopy Images", Signal Processing Magazine 2006; 23(3):32-45.
Abeytunge, Sanjee, et al., "FPGA-based electronics for confocal line scanners with linear detector arrays", Proceedings of SPIE 2009; 7184: 71840A-1-71840A-11.
Amos, W.B.; "Instruments for Fluorescence Imaging"; Protein Localization by Fluorescence Microscopy 2000; 4:67-108.
Bertero, M., et al.; "Super-resolution in confocal scanning microscopy"; Inverse Problems 1987; 3:195-212.
Grochmalicki, J., et al.; "Superresolving masks for incoherent scanning microscopy"; J. Opt. Soc. Am. A 1993; 10(5):1074-1077.
Becker, W.; "Advanced time-correlated single photon counting techniques"; Springer 2005; S. 144.

* cited by examiner

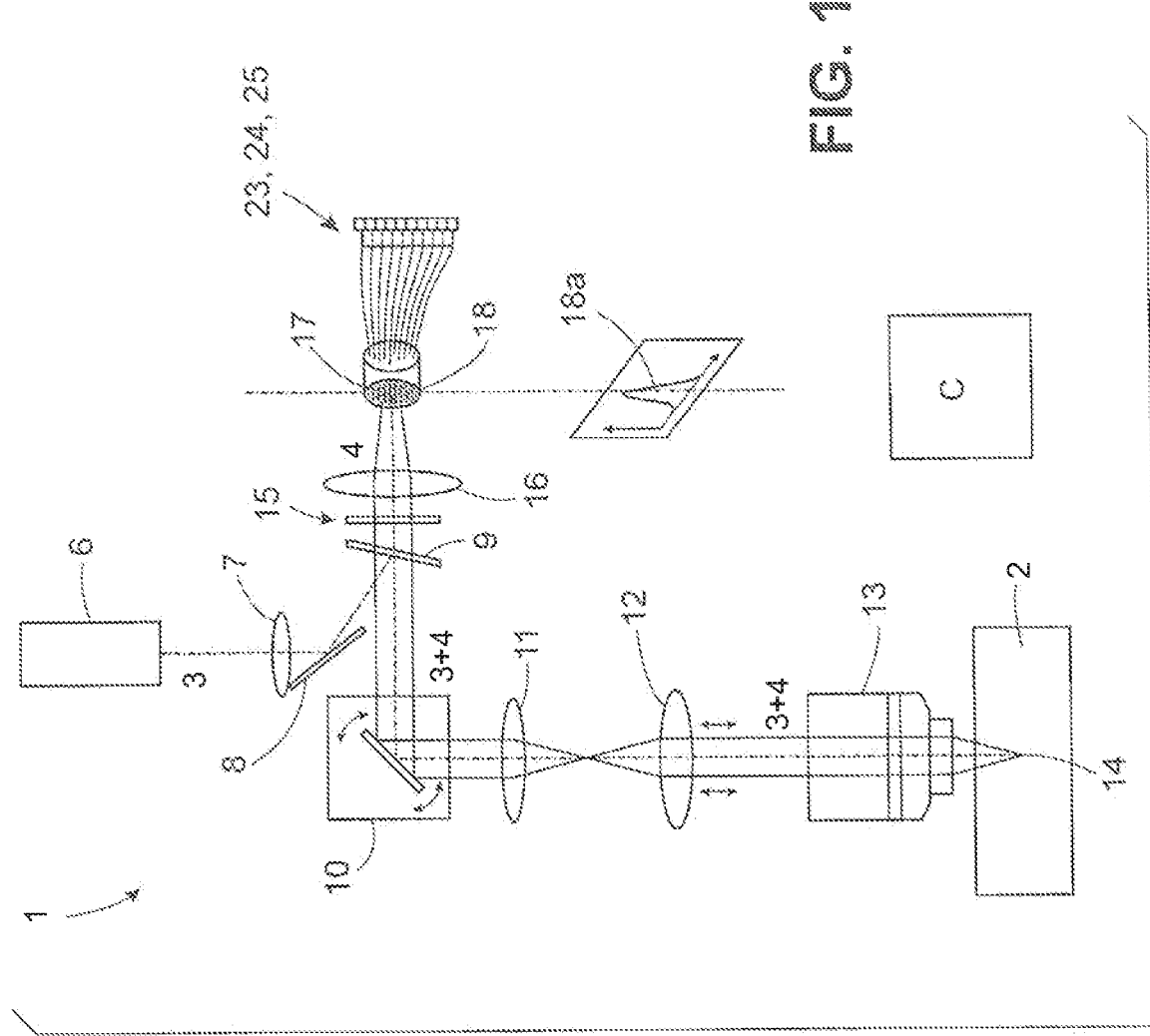

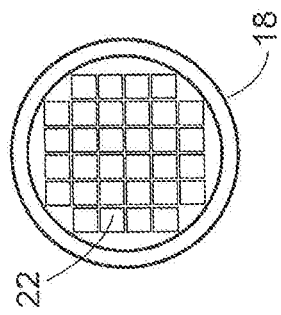
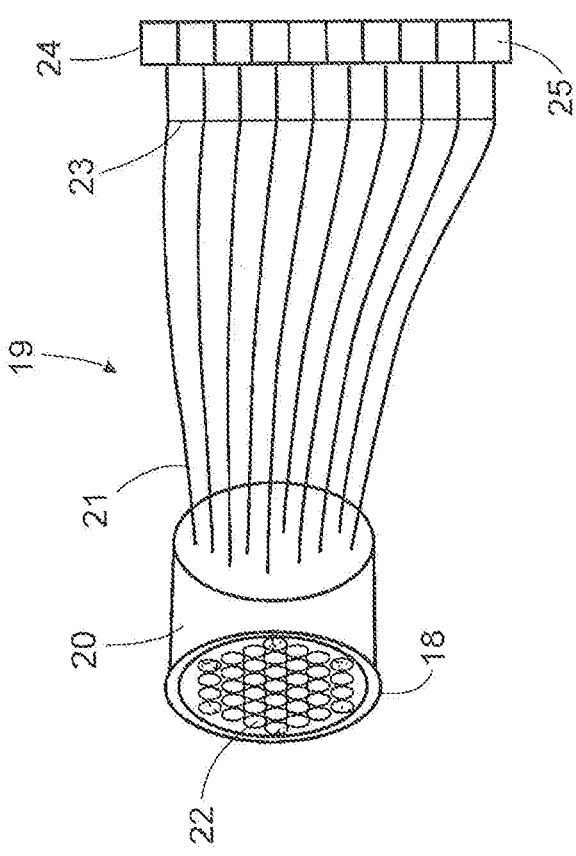
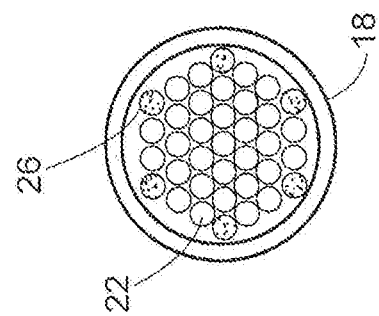

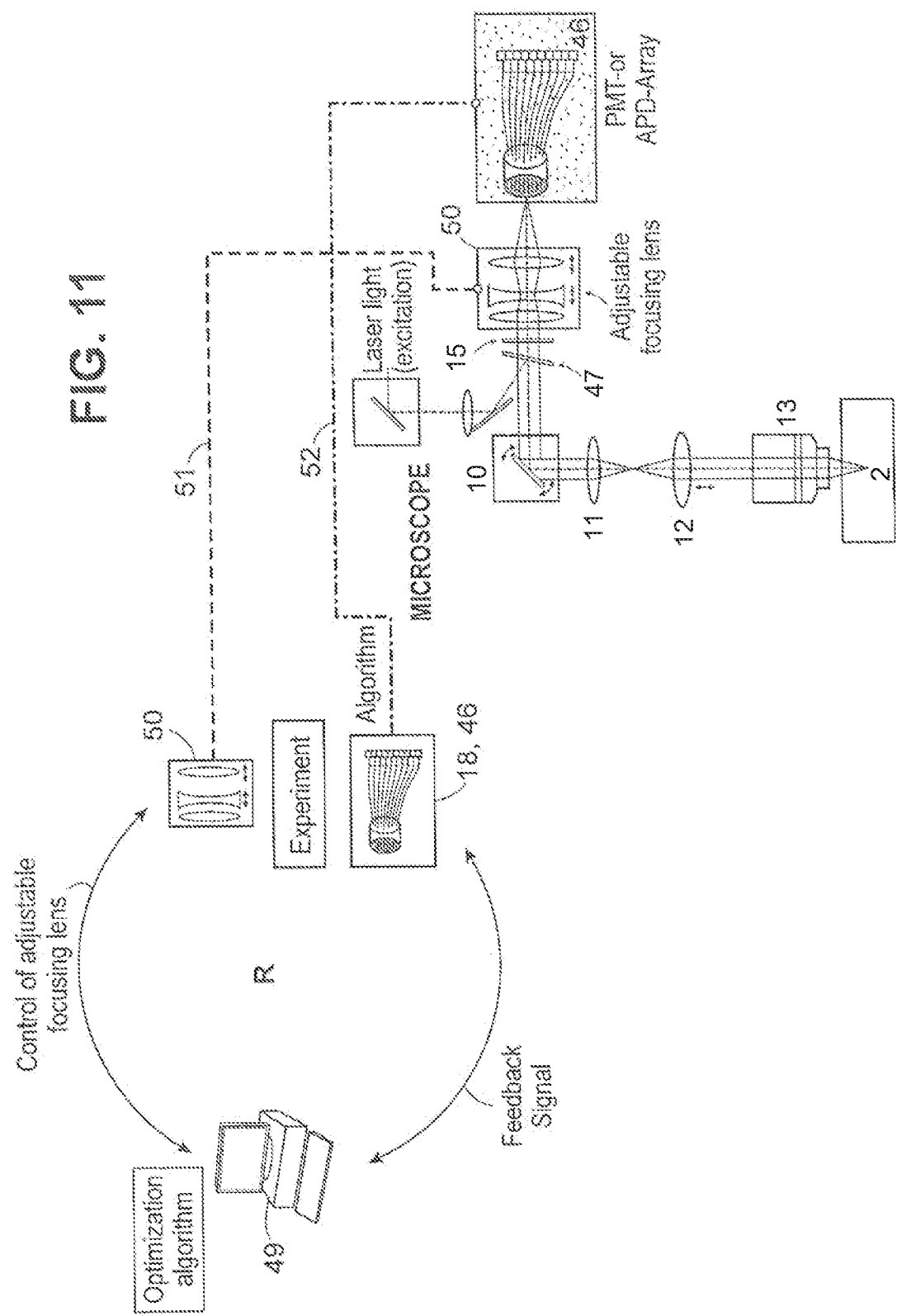

Configuration of the fibers

1 Airy on fiber fiber 1.5 Airy on fiber fiber

2 Airy on fiber fiber

HIGH-RESOLUTION SCANNING MICROSCOPY

RELATED APPLICATIONS

The present application is a continuation of application Ser. No. 14/457,833 filed on Aug. 12, 2014, which is a non-provisional of Provisional Application No. 62/025,649 filed on Jul. 17, 2014 and claims priority benefit of German Application No. DE 10 2013 013 792.6 filed on Aug. 15, 2013 and German Application No. DE 10 2013 019 347.8 filed on Nov. 15, 2013, the contents of each are incorporated by reference in their entirety.

FIELD OF THE INVENTION

The invention relates to a microscope for high resolution scanning microscopy of a sample, having an illumination device for the purpose of illuminating the sample, an imaging device for the purpose of scanning a point or linear spot across the sample and of imaging the point- or linear spot into a diffraction-limited, resting single image, with a reproduction scale in a detection plane, a detector device for the purpose of detecting the single image in the detection plane for various scan positions, with a location accuracy which, taking into account the reproduction scale, is at least twice as high as a full width at half maximum of the diffraction-limited single image, an evaluation device for the purpose of evaluating a diffraction structure of the single image for the scan positions, using data from the detector device, and for the purpose of generating an image of the sample which has a resolution which is enhanced beyond the diffraction limit. The invention further relates to a method for high resolution scanning microscopy of a sample, wherein the sample is illuminated, wherein a point- or linear spot guided over the sample in a scanning manner is imaged into a single image, wherein the spot is imaged into the single image, with a reproduction scale, and diffraction-limited, and the single image is static in a detection plane, wherein the single image is detected for various different scan positions with a location accuracy which is at least twice as high, taking into account the reproduction scale, as a full width at half maximum of the diffraction-limited single image, such that a diffraction structure of the single image is detected, wherein for each scan position, the diffraction structure of the single image is evaluated and an image of the sample is generated which has a resolution which is enhanced beyond the diffraction limit.

BACKGROUND OF THE INVENTION

Such a microscope and/or microscopy method is known, by way of example, from the publication C Mueller and J. Enderlein, Physical Review Letters, 104, 198101 (2010), or EP 2317362 A1, which also lists further aspects of the prior art.

This approach achieves an increase in location accuracy by imaging a diffraction-limited spot on a detection plane. The diffraction-limited imaging process images a point spot as an Airy disk. This diffraction spot is detected in the detection plane in such a manner that its structure can be resolved. Consequently, an oversampling is realized at the detector with respect to the imaging power of the microscope. The shape of the Airy disk is resolved in the imaging of a point spot. With a suitable evaluation of the diffraction structure—which is detailed in the documents named, the disclosure of which in this regard is hereby cited in its entirety in this application—an increase in resolution by a factor of 2 beyond the diffraction limit is achieved.

However, it is unavoidable in this case, for the detector, that it is necessary to capture a single image with multiple times more image information for each point on the sample which is scanned in this way, compared to a conventional laser scanning microscope (shortened to 'LSM' below). If the structure of the single image of the spot is detected, by way of example, with 16 pixels, not only is the volume of data per spot 16-times higher, but also a single pixel also contains, on average, only $1/16$ of the radiation intensity which would fall on the detector of an LSM in a conventional pinhole detection. Because the radiation intensity is of course not evenly distributed across the structure of the single image—for example the Airy disk—in reality even less, and particularly significantly less—radiation intensity arrives at the edge of this structure than the average value of $1/n$ for n pixels.

Consequently, the problem exists of being able to detect quantities of radiation at the detector at high resolution. Conventional Charge-Coupled Device (CCD) arrays which are typically used in microscopy do not achieve sufficient signal-to-noise ratios, such that even a prolongation of the duration for the image capture, which would already be disadvantageous in application per se, would not provide further assistance. Avalanche Photodetector (APD) arrays also suffer from excessively high read noise, such that a prolongation of the measurement duration here as well would result in an insufficient signal/noise ratio. The same is true for complementary metal-oxide semiconductor (CMOS detectors), which also are disadvantageous with regards to the size of the detector element, because the diffraction-limited single image of the spot would fall on too few pixels. Photomultiplier Tube (PMT) arrays suffer from similar constructed space problems. The pixels in this case are likewise too large. The constructed space problems are particularly a result of the fact that an implementation of a microscope for high resolution can only be realized, as far as the effort required for development and the distribution of the device, are concerned, if it is possible to integrate the same into existing LSM constructions. However, specific sizes of the single images are prespecified in this case. As a result, a detector with a larger surface area could only be installed if a lens were additionally configured which would enlarge the image once more to a significant degree—that is, several orders of magnitude. Such a lens is very complicated to design in cases where one wishes to obtain the diffraction-limited structure without further imaging errors.

Other methods are known in the prior art for high resolution, which avoid the problems listed above which occur during detection. By way of example, a method is mentioned in EP 1157297 B1, wherein non-linear processes are exploited using structured illumination. A structured illumination is positioned over the sample in multiple rotary and point positions, and the sample is imaged on a wide-field detector in these different states in which the limitations listed above do not exist.

A method which also achieves high resolution without the detector limitations listed above (that is, a resolution of a sample image beyond the diffraction limit) is known from WO 2006127692 and DE 102006021317. This method, abbreviated as 'PALM', uses a marking substance which can be activated by means of an optical excitation signal. Only in the activated state can the marking substance be stimulated to release certain fluorescence radiation by means of excitation light. Molecules which are not activated do not emit fluorescent radiation, even after illumination with excitation light. The excitation light therefore switches the marking substance into a state in which it can be stimulated to fluoresce. Therefore, this is generally termed a 'switching signal'. The same is then applied in such a manner that at least a certain fraction of the activated marking molecules are spaced apart from neighboring, likewise-activated marking molecules in such a manner that the activated marking molecules are separated on the scale of the optical resolution of the microscope, or can be separated retroactively. This is termed 'isolation' of the activated molecules. It is easy, for these isolated molecules, to determine the center of their radiation distribution which is limited by the resolution, and to therefore determine the location of the molecules using calculation, with a higher precision than the optical imaging actually allows. To image the entire sample, the PALM method takes advantage of the fact that the probability of a marking molecule being activated by the switching signal at a given intensity of the switching signal is the same for all of the marking molecules. The intensity of the switching signal is therefore applied in such a manner that the desired isolation results. This method step is repeated until the greatest possible number of marking molecules have been excited [at least] one time within a fraction which has been excited to fluorescence.

SUMMARY OF THE INVENTION

In the invention, the spot sampled on the sample is imaged statically in a detection plane. The radiation from the detection plane is then redistributed in a non-imaging manner and directed to the detector array. The term "non-imaging" in this case refers to the single image present in the detection plane. Individual regions of the area of this single image can of course, however, be imaged within the laws of optics. As such, imaging lenses can naturally be placed between the detector array and the redistribution element. The single image in the detection plane, however, is not preserved as such in the redistribution.

The term 'diffraction-limited' should not be restricted here to the diffraction limit according to Abbe's Theory. Rather, it should also encompass situations in which the configuration fails to reach theoretical maximum by an error of 20%, due to actual insufficiencies or limitations. In this case as well, the single image has a structure which is termed a "diffraction structure" in this context. It is oversampled.

This principle makes it possible to use a detector array, the size of which does not match the single image. The detector array is advantageously larger or smaller in one dimension that the single image being detected. The idea of the different geometric configuration includes both a different elongation of the detector array and an arrangement with a different aspect ratio with respect to the height and width of the elongation of the single image in the detection plane. The pixels of the detector array can additionally be too large for the required resolution. It is also allowable, at this point, for the outline of the pixel arrangement of the detector array to be fundamentally different than the outline which the single image has in the detection plane. In any case, the detector array according to the invention has a different size than the single image in the detection plane. The redistribution in the method and/or the redistribution element in the microscope make it possible to select a detector array without needing to take into account the dimensional limitations and pixel size limitations which arise as a result of the single image and its size. In particular, it is possible to use a detector row as a detector array.

The image of the sample is created from a plurality of single images, in the conventional LSM manner by scanning the sample with the spot, wherein each of the single images is associated with another sample position—that is, another scan position.

The concept of the invention can also be carried out at the same time for multiple spots in a parallelized manner, as is known for laser scanning microscopy. In this case, multiple spots are sampled on the sample in a scanning manner, and the single images of the multiple spots lie next to each other statically in the detection plane. They are then either redistributed by a shared redistribution element which is accordingly large with respect to surface area, and/or by multiple individual redistribution elements, then relayed to an accordingly large single detector array and/or to multiple individual detector arrays.

The subsequent description focuses, by way of example, on the sampling process using an individual spot. However, this should not be understood as a limitation, and the described features and principles apply in the same manner for the parallel sampling of multiple point spots, as well as to the use of a linear spot. The latter case is of course only diffraction-limited in the direction perpendicular to the elongation of the line, such that the features of this description with regards to this aspect only apply in one direction (perpendicular to the elongation of the line).

With the procedure according to the invention, the LSM method can be carried out at a satisfactory speed and with acceptable complexity of the apparatus. The invention opens up a wide field of applications for a high resolution microscopy principle which has not existed to date.

One possibility for realizing the redistribution and/or the redistribution element consists of using a bundle of optical fibers. These can preferably be designed as multi-mode optical fibers. The bundle has an input which is arranged in the detection plane and which has an adequate dimensioning for the dimensions of the diffraction-limited single image in the detection plane. In contrast, at the output, the optical fibers are arranged in the geometric arrangement which is prespecified by the detector array, and which differs from the input. The output ends of the optical fibers in this case can be guided directly to the pixels of the detector array. It is particularly advantageous if the output of the bundle is gathered in a plug which can be easily plugged into a detector row—for example an APD or PMT row.

It is important for the understanding of the invention to differentiate between pixels of the detector array and the image pixels with which the single image is resolved in the detection plane. Each image pixel is generally precisely functionally assigned to one pixel of the detector array. However, the two are different with respect to their arrangement. Among other things, it is a characterizing feature of the invention that, in the detection plane, the radiation is captured on image pixels which produce an oversampling of the single image with respect to their size and arrangement. In this manner, the structure of the single image is resolved which, due to the diffraction-limited production of the single image, is a diffraction structure. The redistribution element has an input side on which this image pixel is provided. The input side lies in the detection plane. The redistribution element directs the radiation on each image pixel to one of the pixels of the detector array. The assignment of image pixels to pixels of the detector array does not preserve the image structure, which is why the redistribution is non-imaging with respect to the single image. The invention could therefore also be characterized in that, in a microscope of the class, the detector device has a non-imaging redistribution element which has input sides in the detection plane, at which the radiation is captured by means of image pixels. The redistribution element further has an output side on which the radiation captured at the image pixels is relayed to pixels of a detector array, wherein the radiation is redistributed from the input side to the output side in a non-imaging manner with respect to the single image. In an analogous manner, the method according to the invention could be characterized in that, in a method of the class, the radiation is captured in the detection plane by means of image pixels which are redistributed to pixels of the detector array in a non-imaging manner with respect to the single image. The detector array differs from the arrangement and/or the size of the image pixels in the detection plane as regards the arrangement and/or size of its pixels. In addition, the image pixels in the detection plane are provided by the redistribution element in such a manner that, with respect to the diffraction limit, the diffraction structure of the single image is oversampled.

In highly-sensitive detector arrays, it is known that adjacent pixels demonstrate interference when radiation intensities are high, as a result of crosstalk. To prevent this, an implementation is preferred in which the optical fibers are guided from the input to the output in such a manner that optical fibers which are adjacent at the output are also adjacent at the input. Because the diffraction-limited single image does not demonstrate any large jumps in radiation intensity changes, such a configuration of the redistribution element automatically ensures that adjacent pixels of the detector array receive the least possible differences in radiation intensity, which minimizes crosstalk.

In place of a redistribution based on optical fibers, it is also possible to equip the redistribution element with a mirror which has mirror elements with different inclinations. Such a mirror can be designed, by way of example, as a multi-faceted mirror, a Digital Micromirror Device (DMD), or adaptive mirror, wherein in the latter two variants, a corresponding adjustment and/or control process ensures the inclination of the mirror elements. The mirror elements direct the radiation from the detection plane to the pixels of the detector array, the geometrical design of which is different from the mirror elements.

The mirror elements depict—as do the optical fiber ends at the input of the optical fiber bundle—the image pixels with respect to the resolution of the diffraction structure of the single image. Their size is decisive for the oversampling. The pixel size of the detector array is not. As a result, a group of multiple single detectors is understood in this case to be a detector array, because they always have a different arrangement (that is—a larger arrangement) than the image pixels in the detection plane.

In LSM, different lenses are used depending on the desired resolution. An exchange of a lens changes the dimensions of a single image in the detection plane. For this reason, it is preferred that a zoom lens is arranged in front of the detection plane in the direction of imaging for the purpose of matching the size of the single image to the size of the detector device. Such a zoom lens varies the size of the single image in a percent range which is significantly smaller than 100%, and is therefore much simpler to implement than a multiplication of the size of the single image—which was described as disadvantageous above.

The illumination of the sample is preferably carried out as in a typical LSM process, likewise scanning—although this is not absolutely necessary. However, the maximum increase in resolution is achieved in this way. If the sample is illuminated in a scanning manner, it is advantageous that the illumination device and the imaging device have a shared scanning device which guides an illumination spot across the sample, and simultaneously descans the spot at which the sample is imaged, which is coincident with the illumination spot, with respect to the detector, such that the single image is static in the detection plane. In such a construction, the zoom lens can be placed in the shared part of the illumination device and imaging device. The lens then makes it possible to not only match the single image to the size of the detector in the detection plane, but also it additionally enables the available illumination radiation to be coupled into the lens pupil completely, without edge loss, wherein said lens pupil can vary together with the selection of the lens.

A radiation intensity-dependent crosstalk between adjacent pixels of the detector array can, as already explained, be reduced during the redistribution by means of an optical fiber bundle by a suitable arrangement of the optical fibers in the bundle. In addition or alternatively thereto, it is also possible to carry out a calibration. For this purpose, each optical fiber receives radiation one after the other, and the interference signal is detected in neighboring pixels. In this manner, a calibration matrix is established, by means of which a radiation intensity-dependent crosstalk between adjacent pixels is corrected in the later microscopy of the sample.

The resolution of the diffraction structure of the single image also makes it possible to determine a direction of movement of the spot, wherein the sample is moved along the same during the scanning. This direction of movement is known in principle from the mechanism of the scanner (for example, a scanning mirror or a moving sample table), but nevertheless there are residual inaccuracies in this case arising from the mechanism. These can be eliminated by evaluating signals of individual pixels of the detector array by means of cross-correlation. In this case, one takes advantage of the fact that, related adjacent image pixels in the sample overlap to a certain degree due to the diffraction-limited imaging of the spot, whereas their centers lie adjacent to each other. If the signals of such image pixels are subjected to a cross-correlation, it is possible to reduce and/or to completely eliminate a residual inaccuracy which persists as a result of unavoidable tolerances of the scanning mechanism.

In addition to the increased resolution, it is possible to detect a chronological change in the fluorescence in the detection volume comprised by the spot via the spatial and chronological correlation of the signals from a series of measurements of the individual detector elements (to which the image pixels in the detection plane are functionally assigned). By way of example, diffusion coefficients can be determined from a chronological correlation, as in fluorescence correlation spectroscopy, and oriented diffusion and diffusion barriers can be visualized by incorporating the spatial correlation between image pixels. Movement processes of the fluorescence molecules are also of great interest for tracking applications as well, because the illumination spot in this case should follow the movement of the fluorescent molecules. The arrangement described here makes it possible to determine the movement direction with high precision, even during the bleaching time of a pixel. For this reason, it is preferred, as one implementation, that changes in the sample are detected by means of determining and evaluating a chronological change in the diffraction-limited single image for the point- or linear spot which is stationary in the sample.

The procedure according to the invention also makes it possible to modify the illumination distribution in scanning illumination processes—for example by means of a phase filter. The method as described in Gong et al., Opt. Let., 34, 3508 (2009) can be realized very easily as a result.

Where a method is described herein, a control device implements this method in the operation of the microscope.

It should be understood that the features named above and explained further below can be used not only in the given combinations, but also in other combinations or alone without departing from the scope of the present invention.

BRIEF DESCRIPTION OF THE DRAWINGS

The invention is described in greater detail below with reference to the attached drawings, which also disclose essential features of the invention, wherein:

FIG. 1 shows a schematic illustration of a laser scanning microscope for high resolution microscopy, FIG. 2 shows an enlarged illustration of a detector device of the microscope in FIG. 1, FIG. 3 and FIG. 4 show top views of possible embodiments of the detector device 19 in a detection plane, FIG. 11 shows a modification of the microscope of FIG. 10.

DESCRIPTION OF THE EMBODIMENTS

Figure 5:
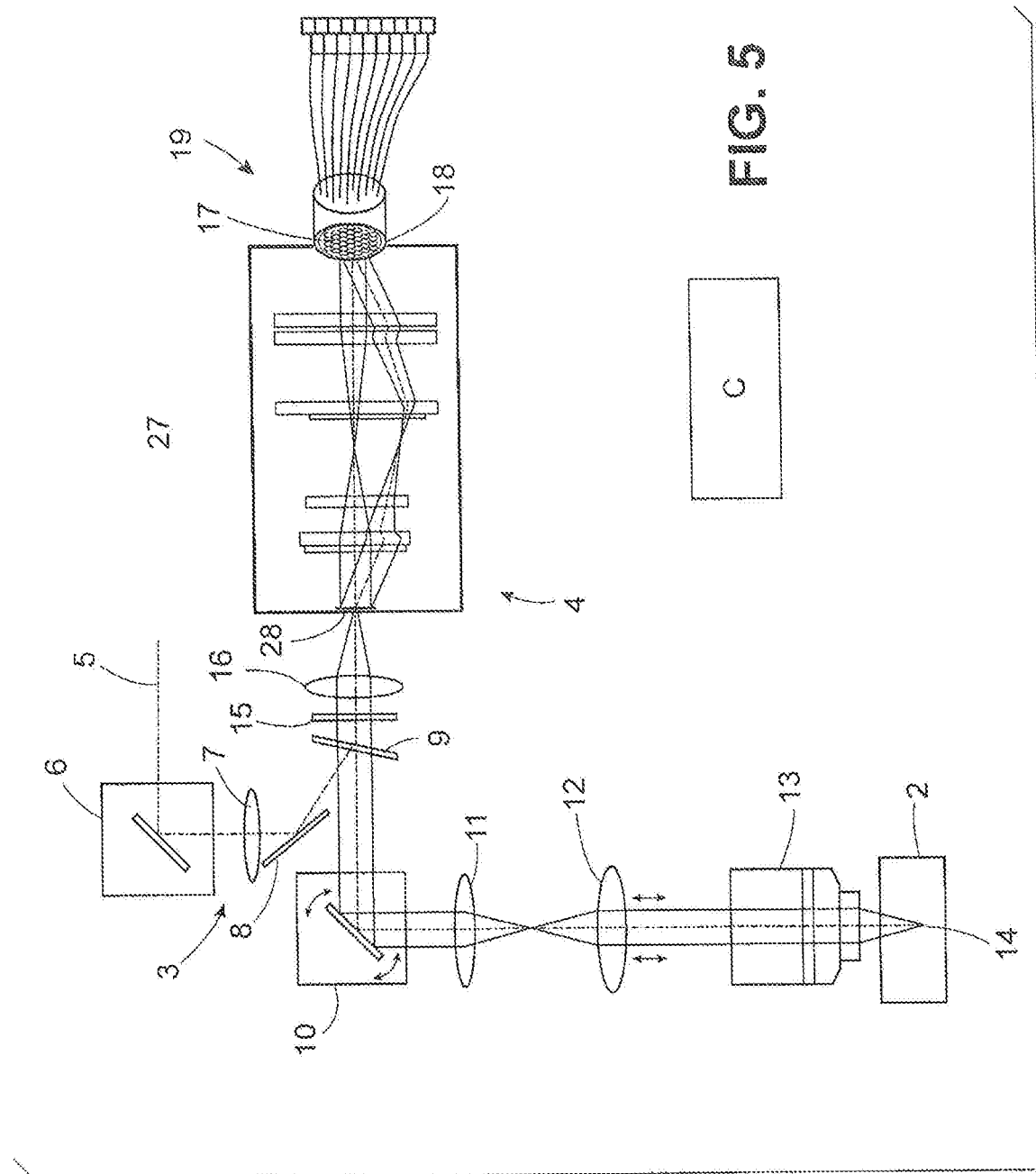
FIG. 5 shows one implementation of the microscope in FIG. 1 using a zoom lens, for the purpose of adapting the size of the detector field.

FIG. 1 schematically shows a laser scanning microscope 1 which is designed for the purpose of microscopy of a sample 2. The laser scanning microscope (abbreviated below as LSM) 1 is controlled by a control device C and comprises an illumination beam path 3 and an imaging beam path 4. The illumination beam path illuminates a spot in the sample 2, and the imaging beam path 4 images this spot, subject to the diffraction limit, for the purpose of detection. The illumination beam path 3 and the imaging beam path 4 share a plurality of elements. However, this is likewise less necessary than a scanned spot illumination of the sample 2. The same could also be illuminated in wide-field.

The illumination of the sample 2 in the LSM 1 is carried out by means of a laser beam 5 which is coupled into a mirror 8 via a deflection mirror 6, which is not specifically functionally necessary, and a lens 7. The mirror 8 functions so that the laser beam 5 falls on an emission filter 9 at a reflection angle. To simplify the illustration, only the primary axis of the laser beam 5 is drawn for the same.

Following the reflection on the emission filter 9, the laser beam 5 is deflected biaxially by a scanner 10, and focused by means of lenses 11 and 12 through an objective 13 to a spot 14 in the sample 2. The spot in this case is point-shaped in the illustration in FIG. 1, but a linear spot is also possible. Fluorescence radiation excited in the spot 14 is routed via the objective 13, the lenses 11 and 12, and back to the scanner 10, after which a static light beam once more is present in the imaging direction. This passes through the emission filters 9 and 15, which have the function of selecting the fluorescence radiation in the spot 14, with respect to the wavelength thereof, and particularly of separating the same from the illumination radiation of the laser beam 5, which can serve as excitation radiation, by way of example. A lens 16 functions so that the spot 14 overall is imaged into a diffraction-limited image 17 which lies in a detection plane 18. The detection plane 18 is a plane which is conjugated to the plane in which the spot 14 in the sample 2 lies. The image 17 of the spot 14 is captured in the detection plane 18 by a detector device 19 which is explained in greater detail below in the context of FIGS. 2 to 4. In this case, it is essential that the detector device 19 spatially resolves the diffraction-limited image 17 of the spot 14 in the detection plane 18.

The intensity distribution of the spot over the detection cross-section (the Gaussian distribution) in 18 is illustrated below as 18a in FIG. 1.

The control device C controls all components of the LSM 1, particularly the scanner 10 and the detector device 19. The control device captures the data of each individual image 17 for different scan positions, analyzes the diffraction structure thereof, and generates a high resolution composite image of the sample 2.

The LSM 1 in FIG. 1 is illustrated by way of example for a single spot which is scanned on the sample. However, it can also be used for the purpose of scanning according to a linear spot which extends, by way of example, perpendicular to the plane of the drawing in FIG. 1. It is also possible to design the LSM 1 in FIG. 1 in such a manner that multiple adjacent point spots in the sample are scanned. As a result, their corresponding single images 17 lie in the detection plane 18, likewise adjacent to each other. The detector device 19 is then accordingly designed to detect the adjacent single images 17 in the detection plane 18. An extended plug 23, detector array 24 and pixels 25 are described in more detail below in relation to FIG. 2.

The detector device 19 is illustrated in an enlarged fashion in FIG. 2. It consists of an optical fiber bundle 20 which feeds a detector array 24. The optical fiber bundle 20 is built up of individual optical fibers 21. The ends of the optical fibers 21 form the optical fiber bundle input 22, which lies in the detection plane 18. The individual ends of the optical fibers 21 therefore constitute pixels by means of which the diffraction-limited image 17 of the spot 14 is captured. Because the spot 14 in the embodiment in FIG. 1 is, by way of example, a point spot, the image 17 is an Airy disk, the size of which remains inside the circle which, in FIGS. 1 and 2, represents the detection plane 18. The size of the optical fiber bundle input 22 is therefore such, that the size of the Airy disk is covered thereby. The individual optical fibers 21 in the optical fiber bundle 20 are given a different geometric arrangement at their outputs than at the optical fiber bundle input 22, particularly in the form of an extended plug 23 in which the output ends of the optical fibers 21 lie adjacent to each other. The plug 23 is designed to match the geometric arrangement of the detector array 24 (i.e., the detector row)—that is, each output end of an optical fiber 21 lies precisely in front of a pixel 25 of the detector array 24.

The geometric dimensions of the redistribution element are entirely fundamental—meaning that they are matched on the input side thereof to the dimensions of the single image (and/or, in the case of multiple point-spots, to the adjacent single images, regardless of the implementation of the redistribution element, which is made in FIG. 4 by an optical fiber bundle). The redistribution element has the function of capturing the radiation from the detection plane 18, in such a manner that the intensity distribution of the single image 17, measured by the sampling theorem, is oversampled with respect to the diffraction limit. The redistribution element therefore has pixels (formed by the input ends of the optical fibers in the construction shown in FIG. 3) lying in the detection plane 18, which are smaller by at least a factor of 2 than the smallest resolvable structure which is produced in the detection plane 18 from the diffraction limit, taking into account the reproduction scale.

Of course, the use of a plug 23 is only one of many possibilities for arranging the output ends of the optical fibers 21 in front of the pixels 25. It is equally possible to use other connections. In addition, the individual pixels 25 can be directly fused to the optical fibers 21. It is not at all necessary to use a detector row 24. Rather, an individual detector can be used for each pixel 25.

FIGS. 3 and 4 show possible embodiments of the optical fiber bundle input 22. The optical fibers 21 can be melted together at the optical fiber bundle input 22. In this way, a higher fullness factor is achieved—meaning that holes between the individual optical fibers 21 at the optical fiber bundle input 22 are minimized. The melting would also lead to a certain crosstalk between adjacent optical fibers. If one would like to prevent this, the optical fibers can be glued. A rectangular arrangement of the ends of the optical fibers 21 is also possible, as FIG. 4 shows.

The individual optical fibers 21 are preferably functionally assigned to the individual pixels 25 of the detector array 24 in such a manner that optical fibers 21 positioned adjacent to each other at the optical fiber bundle input 22 are also adjacent at the detector array 24. By means of this approach, crosstalk in minimized between adjacent pixels 25, wherein said crosstalk can arise, by way of example, from scatter radiation or during the signal processing of the individual pixels 25. If the detector array 24 is a row, the corresponding arrangement can be achieved by fixing the sequence of the individual optical fibers on the detector row using a spiral which connects the individual optical fibers one after the other in the perspective of a top view of the detection plane 18.

FIG. 3 further shows blind fibers 26 which lie in the corners of the arrangement of the optical fibers 21 at the optical fiber bundle input 22. These blind fibers are not routed to pixels 25 of the detector array. At the positions of the blind fibers, there would no longer be any signal intensity required for the evaluation of the signals. As a result, one can reduce the number of the optical fibers 21, and therefore the number of the pixels 25 in the detector row 24 or the detector array, in such a manner that it can be possible to work with 32 pixels, by way of example. Such detector rows 24 are already used in other ways in laser scanning microscopy, with the advantage that only one signal evaluation electronic unit needs to be installed in such laser scanning microscopes, and a switch is then made between an existing detector row 24 and the further detector row 24 which is added by the detector device 19.

According to FIG. 4, optical fibers with a square base shape are used for the bundle. They likewise have a high degree of coverage in the detection plane, and therefore efficiently collect the radiation.

FIG. 5 shows one implementation of the LSM 1 in FIG. 1, wherein a zoom lens 27 is arranged in front of the detection plane 18. The conjugated plane in which the detection plane 18 was arranged in the construction shown in FIG. 1 now forms an intermediate plane 28, from which the zoom lens 27 captures the radiation and relays the same to the detection plane 18. The zoom lens 27 makes it possible for the image 17 to be optimally matched to the dimensions of the input of the detector device 19.

Figure 6:
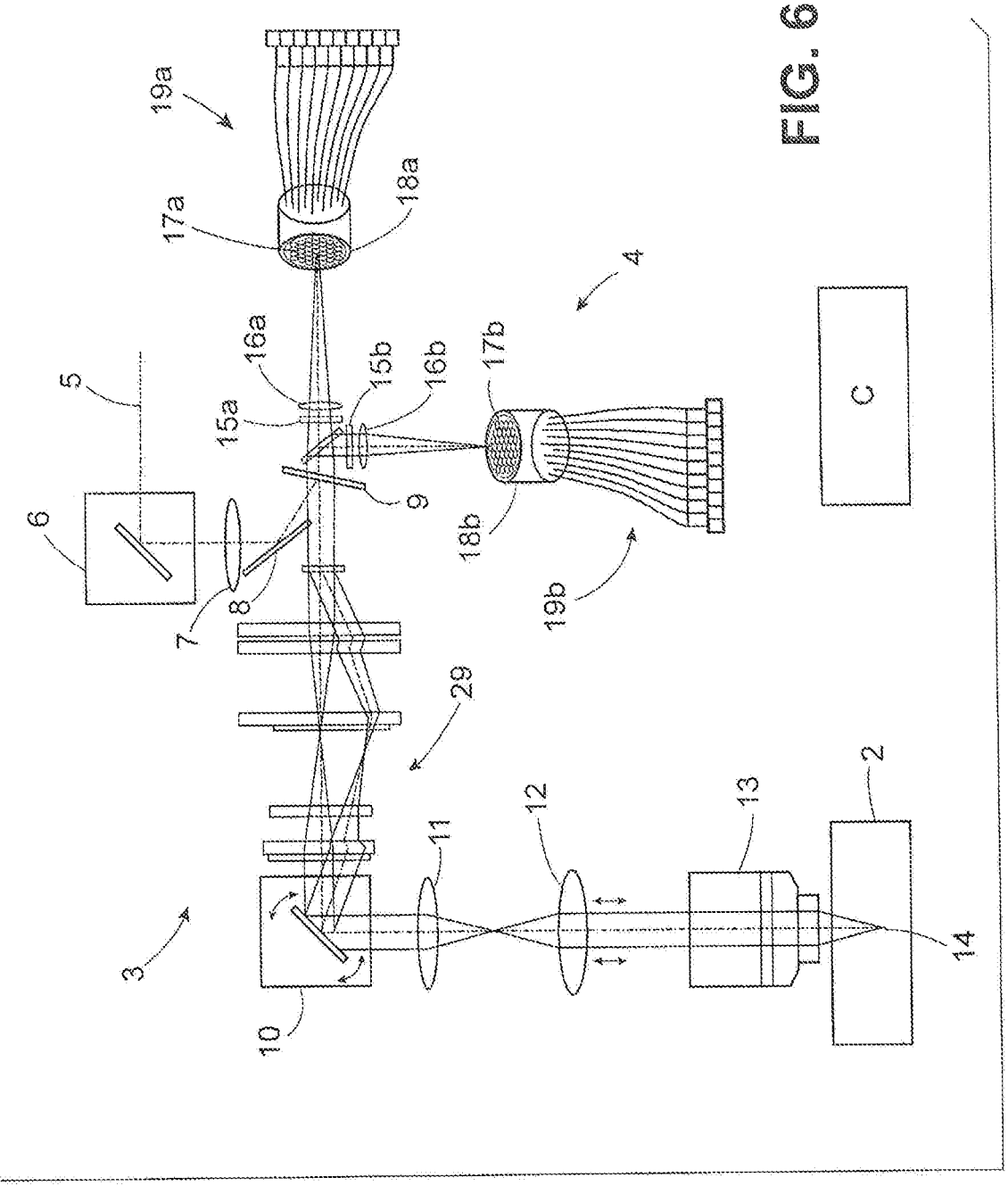
FIG. 6 shows a modification of the microscope in FIG. 5 with respect to the zoom lens and with respect to a further implementation for multi-color imaging.

FIG. 6 shows yet another modification of the laser scanning microscope 1 in FIG. 1. On the one hand, the zoom lens is arranged in this case as the zoom lens 29, in such a manner that it lies in a part of the beam path, the same being the route of both the illumination beam path 3 and the imaging beam path 4. As a result, the advantage is accrued that not only the size of the image 17 on the input side of the detector device 19 can be adapted, but also that the pupil fullness of the lens 13, relative to the imaging beam path 4, and therefore the exploitation of the laser beam 5, can be adapted as well.

In addition, the LSM 1 in FIG. 6 also has a two-channel design, as a result of the fact that a beam splitter is arranged downstream of the emission filter 9, and separates the radiation into two separate color channels. The corresponding elements of the color channels each correspond to the elements which are arranged downstream of the emission filter 9 in the imaging direction in the LSM 1 in FIG. 1. The color channels are differentiated in the illustration in FIG. 6 by the reference number suffixes "a" and/or "b".

Of course, the implementation using two color channels is independent of the use of the zoom lens 29. However, the combination has the advantage that a zoom lens 27 which would need to be independently included in each of the color channels, and therefore would be present twice, is only necessary once. Of course, the zoom lens 27 can also, however, be used in the construction according to FIG. 1, and the LSM 1 in FIG. 6 can also be realized without the zoom lens 29.

Figure 7:
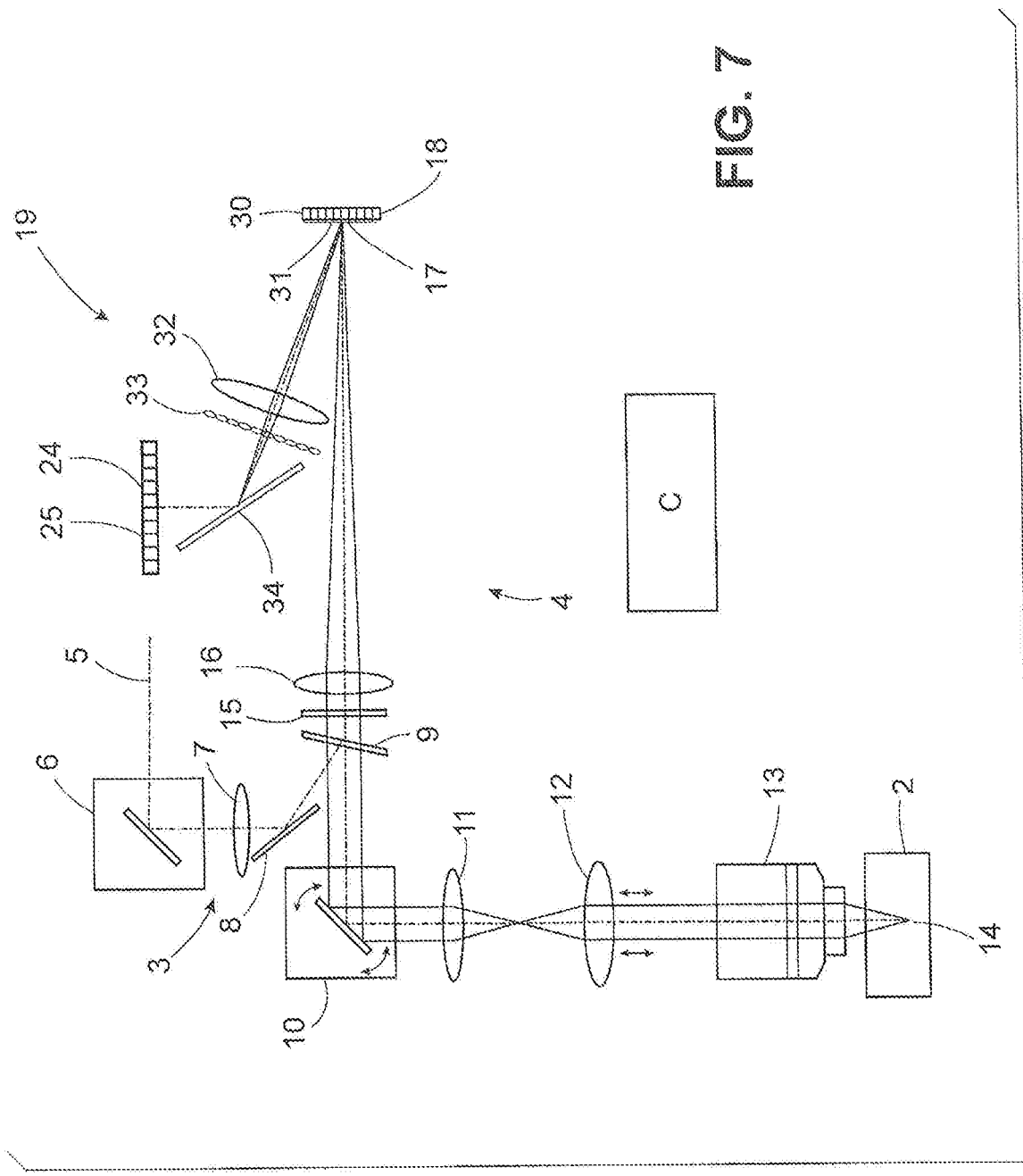
FIG. 7 shows a modification of the microscope in FIG. 1, wherein the modification pertains to the detector device.

FIG. 7 shows a modification of the LSM 1 in FIG. 1, with respect to the detector device 19.

The detector device 19 now has a multi-facet mirror 30 which carries individual facets 31. The facets 31 correspond to the ends of the optical fibers 21 at the optical fiber bundle input 22 with respect to the resolution of the image 17. The individual facets 31 differ with respect to their inclination from the optical axis of the incident beam. Together with a lens 32 and a mini-lens array 33, as well as a deflector mirror 34 which only serves the purpose of beam folding, each facet 31 reproduces a surface area segment of the single image 17 on one pixel 25 of a detector array 24. Depending on the orientation of the facets 31, the detector array 24 in this case can preferably be a 2D array. However, a detector row is also possible.

Figure 8:
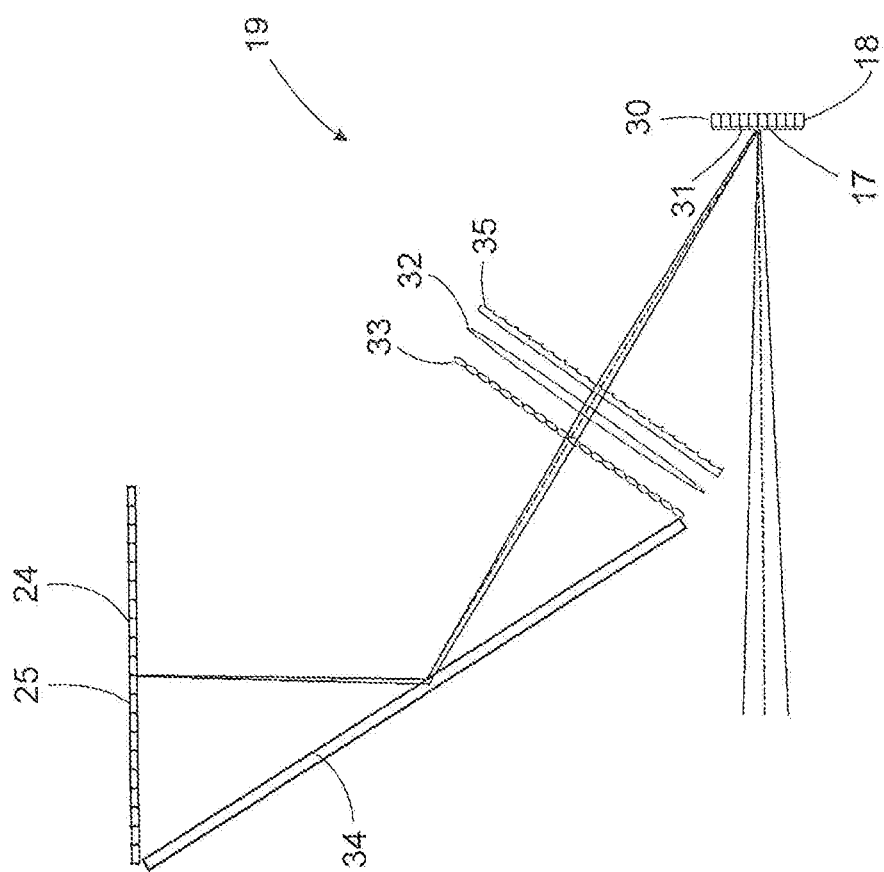
FIG. 8 shows a modification of the detector device 19 in FIG. 7.

FIG. 8 shows one implementation of the detector device 19 in FIG. 7, wherein a refractive element 35 is still arranged in front of the lens 32, and distributes the radiation particularly well to a detector row.

The detector array 24 can, as already mentioned, be selected based on its geometry, with no further limitations. Of course, the redistribution element in the detector device 19 must then be matched to the corresponding detector array. The size of the individual pixels with which the image 17 is resolved is also no longer prespecified by the detector array 24, but rather by the element which produces the redistribution of the radiation from the detection plane 18. For an Airy disk, the diameter of the disk in a diffraction-limited image is given by the formula 1.22·λ/NA, wherein λ is the average wavelength of the imaged radiation, and NA is the numerical aperture of the lens 13. The full width at half maximum is then 0.15·λ/NA. In order to achieve high resolution, it is sufficient for location accuracy of the detection to be made twice as high as the full width at half maximum—meaning that the full width at half maximum is sampled twice. A facet element 31 and/or an end of an optical fiber 21 at the optical fiber bundle input 22 may therefore be, at most, half as large as the full width at half maximum of the diffraction-limited single image. This of course is true taking into account the reproduction scale which the optics behind the lens 13 produces. In the simplest case, a 4×4 array of pixels in the detection plane 18 per full width at half maximum would thereby be more than adequate.

The zoom lens which was explained with reference to FIGS. 5 and 6, makes possible—in addition to a [size] adaptation in such a manner that the diffraction distribution of the diffraction-limited image 17 of the spot 14 optimally fills out the input surface of the detector device 19—a further operating mode, particularly if more than one Airy disk is imaged in the detection plane 18. In a measurement in which more than one Airy disk is imaged on the detector device 19, light from further depth planes of the sample 2 can be detected on the pixels of the detector device 19 which are further outward. During the processing of the image, additional signal strengths are obtained without negatively influencing the depth resolution of the LSM 1. The zoom lens 27 and/or 29 therefore makes it possible to choose a compromise between the signal-to-noise ratio of the image and the depth resolution.

The prerequisite for achieving the increase in resolution using the named methods is the fine scanning of the fluorescence light field distribution in the pinhole plane (detection plane). In order to keep the data transfer- and data processing rate low, the configuration uses the least possible number of detector (fiber) elements. This technical approach, in combination with the dependence of the dimensions of the field distribution in the detection plane on the diameter of the lens pupil and the wavelength of the fluorescence, makes it necessary to be able to match the lens-specific dimensions of the sub-Airy field distribution in relative size to the fiber bundle, for optimum scanning.

The classic, widely-used approach of being able to control the size of the field distribution in the pinhole plane consists of using a zoom system in a pupil plane. As an alternative, a focusing lens with a variable aperture and fixed focus length can be used (see FIG. 11 as well). This variant consists, inter alia, of fewer lenses than are required in a pupil/zoom system. This means that both the complexity and the costs are lower in the case of the focusing lens. Only one fiber bundle is required, and the size of the fluorescence light is kept constant.

Figure 9:
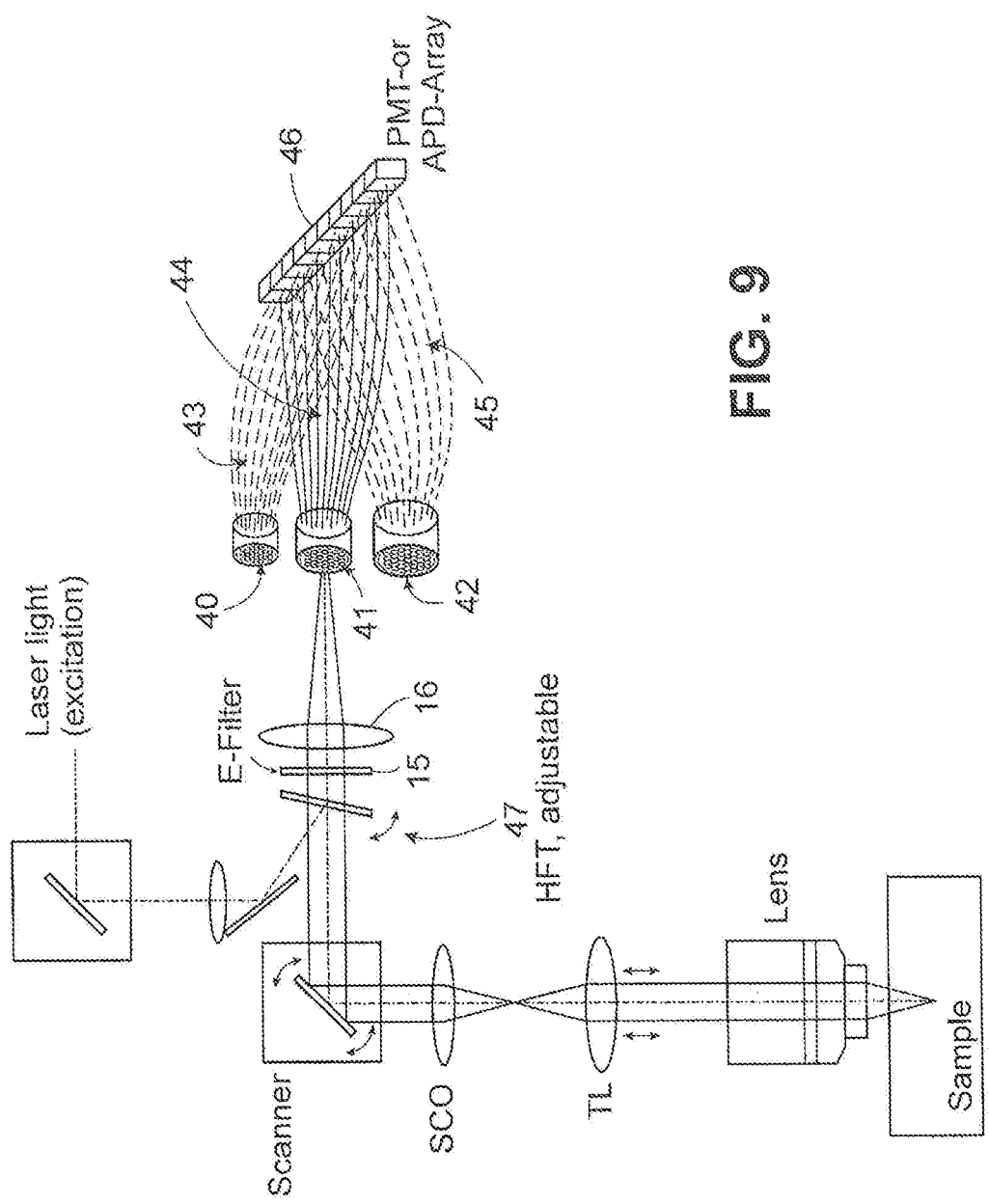
FIG. 9 shows a schematic illustration of a laser scanning microscope as described above with reference to the illustrations in FIGS. 1-8, with sub-Airy resolution detection in the pinhole plane, and a multi-fiber bundle arrangement.

If one would like to optionally, or completely, dispense with a zoom system or an adjustable focusing lens, and nevertheless ensure the required lens- and/or wavelength flexibility, it is suggested according to the invention that multiple fiber bundles with different diameters be arranged next to each other, and the individual fibers of the bundles be made to each preferably end at the same detector element of a detector array (FIG. 9, 10). The fiber bundle with the most suitable sampling is moved onto the optical axis, or the primary color splitter in the illumination beam path is tilted in such a suitable manner (similarly to an adjustment of the pinhole by means of the primary color splitter) that the selected fiber bundle is illuminated, and only this light is detected and ultimately included in the final accounting.

These methods of selecting the most suitable fiber bundle can be switched very quickly (compared to a size modification of the Airy disk on a fiber bundle, by means of a zoom system), such that this solution is particularly advantageous in the case of multi-spectral measurements.

Once the optimum adjustment of the focusing lens (FIG. 11) or the best fiber bundle (FIG. 10) is found, the image contrast is increased following re-sorting of the data according to Sheppard et al. [2] (particularly for higher spatial frequencies due to the increase in resolution achieved and/or to an improvement in the SNR). This optimization of the scanning which is most suitable for the improvement of the resolution can be carried out in a closed regulating loop (a closed loop) (FIG. 11: As a measure of finding the optimum adjustment and/or the optimum fiber bundle, a combination of contrast and signal-to-noise ratio is particularly suitable, because the optimum focus is clearly defined by both conditions).

In the case of thick samples having a high fraction of light outside of the focus, the control parameters SNR favor a focusing lens adjustment or a fiber bundle wherein multiple Airy disks are imaged on the fiber bundle. On the other hand, the contrast in a reconstructed image (a reconstruction, by way of example, according to Sheppard et al., In Optik 80, No. 2, 53 (1982)) favors a detection light scanning which preferably only images one Airy disk on the fiber bundle, for optimum resolution. By means of a control variable, the system can be optimized between resolution and SNR, wherein the properties of the sample used are taken into account in the regulation.

For a regulation, the data at the start of the capture of an image can be used, by way of example, to optimize the parameters (focusing lens adjustment within an image) (if the image already has representative information at the edge thereof). As an alternative, the relevant information is first captured by means of snapshots, for the purpose of optimization for a selected region in the image, with reduced laser illumination and/or increased scanning speed.

An alternative to the opto-mechanical embodiments named above, for the optimum (sub-) Airy scanning of the detection light, can be the use of a significantly greater number of optical fiber and detector elements from the beginning, for example 2×2×32=128, necessary in principle. The optics must then not be variable.

In this variant, there are high data rates which cannot currently be processed by real-time computers. For this reason, it is advantageous to drop the data down from, by way of example the 128 channels to 32 channels. For the case where precisely 1 Airy falls on the fiber bundle, 4 channels, by way of example, are each combined in electronics which are near to the detector (FPGA or a microcontroller), such that the combined channels have the known arrangement. For the case in which exactly 2 Airys are imaged by the fiber bundle, only the inner 32 channels are read out. For intermediate values, a matching configuration must be found depending on the size of the Airy disk, said configuration combining fibers in a channel in order to achieve an increase in resolution in each lateral direction. An interpolation in the FPGA to, for example, 32 channels is likewise possible.

The invention is described below in greater detail with reference to the schematic illustrations in FIGS. 9-12.

The individual reference numbers (in addition to the reference numbers of the illustrations above) indicate:

40, 41, 42: fiber bundle
43, 44, 45: optical fiber
46: multi-channel detector
47: pivotable primary color splitter
48: slider
R: regulating loop
49: control unit/computer
50: adjustable focusing optics
51: signal assignment
52: signal assignment
53: fiber inputs
54, 55, 56: distribution of Airy diameter to the fiber inputs FIG. 9 shows a schematic illustration of a laser scanning microscope as described above with reference to the illustrations in FIGS. 1-8, with sub-Airy resolution detection in the pinhole plane, and a multi-fiber bundle arrangement.

In this case, multiple fiber bundles are applied to one and the same multi-channel detector, which can be a PMT or APD array—or a PMT or APRD row.

The optical fibers 43, 44, 45 originating from fiber bundles 40, 41, 42 in this case, advantageously lie on the individual detector elements one over the other with respect to their individual fiber ends, such that a detection of the light from the fiber ends of each optically active fiber bundle can be realized without a problem.

As an alternative, only every pair of two fiber ends can also lie one above the other on the respective detector element, and/or adjacent segments of the detector can be used for the fibers of different fiber bundles.

The individual fiber bundles 40, 41, 42 advantageously apply their light to the detector elements one after another, as a result of one of the fiber bundles being brought into position at the light spot which is imaged by the sample light on the input surfaces of the fiber bundles, as described further above.

In this case, 40-42 can be fiber bundles with different fiber diameters and/or fiber spacings.

An adaptation can be made by changing the fiber bundles, for example in the case of a lens change for the lens O and/or in the case of a change of the illumination wavelength.

Figure 10:
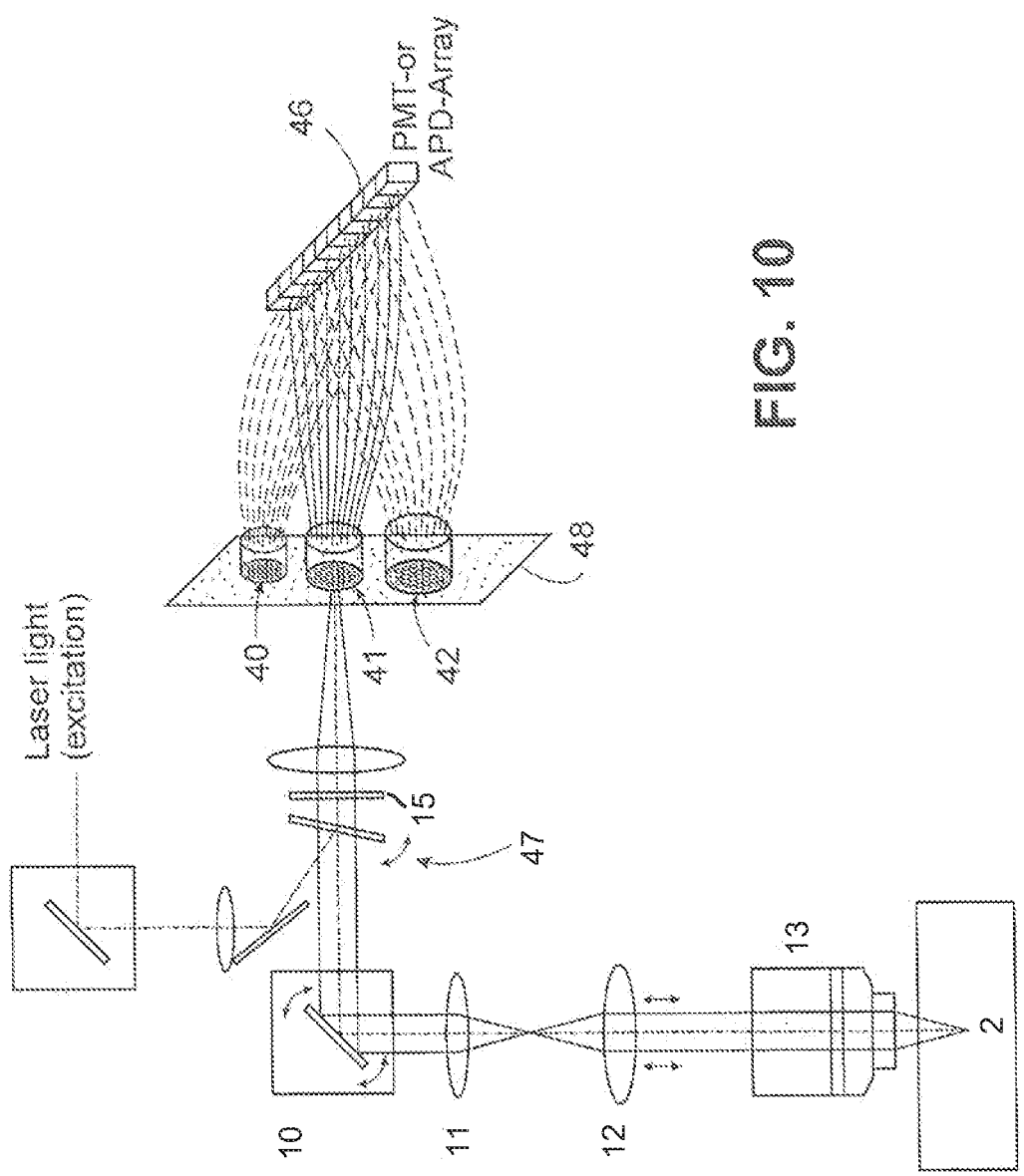
FIG. 10 illustrates a further embodiment with slider.

A slider 48 is illustrated in FIG. 10, which captures the fiber bundles 40-42 and which can slide perpendicular to the optical axis in order to bring the fiber bundles one after another into the optical axis. It is also possible that the slider 48 only slides the aperture opening to a more suitable fiber bundle, and the flexible primary color splitter deflects the detection light onto this more suitable fiber bundle.

A primary color splitter 47 which is able to pivot toward the optical axis is illustrated as an alternative, as a way of applying light to different fiber bundles 40-42 using its variable inclination.

FIG. 11 shows the optimization of the fluorescence light scanning according to the invention in a closed regulating loop, with a feedback signal.

An advantageous regulating loop R is illustrated in FIG. 11, and is also explained with reference to FIG. 12.

In FIG. 11, an adjustment—for example of an adjustable focusing lens 50—and a change of the fiber bundle, as described above in FIG. 10, is carried out via a control unit/computer 49, utilizing an evaluation of image properties such as the image contrast—for example following the finding of the Sheppard sum (which already has an improved resolution)—or the signal-to-noise ratio or the image resolution.

When the focusing lens 50 and the fiber bundle 40-42 are optimally focused, the image contrast is increased as a result of an increase in the resolution and/or improvement of the signal-to-noise ratio, particularly at higher spatial frequencies.

Therefore, an optimization of the captured signal can be advantageously carried out via the individual adjustments and settings described above, based on the respective conditions.

A combination of contrast and signal-to-noise ratio as a control variable is particularly suitable in this case, because the optimum focus is clearly defined by both conditions.

An optimum evaluation process for the detection light can advantageously contribute in this case, by providing a combined reading of multiple detection fibers 43-45.

FIG. 12: Oversampling of the detection light and optimum binning to reduce the data transmission rate without losing resolution. A) Example with 128 fibers and detector elements. B) 1 Airy is imaged on the 128 fibers and then binned by a factor of four. C) 2 Airys are imaged on the 128 fibers; only the 32 inner channels are read out. D) 1.5 Airys on the total fiber array.

Figure 12A:
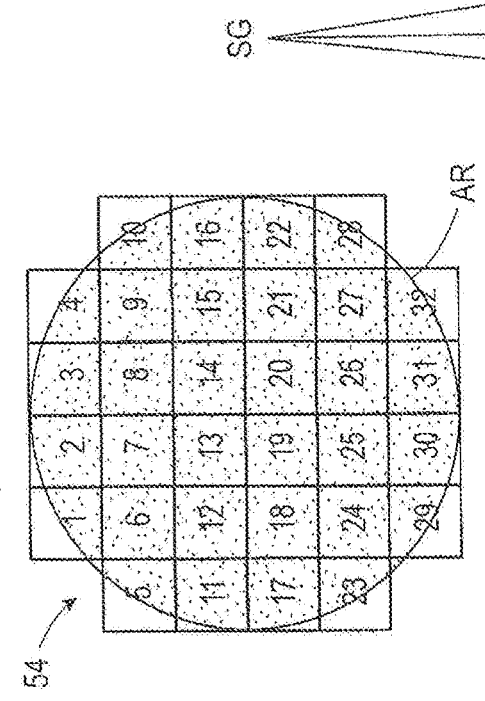
FIG. 12A shows sampling of the detection light and binning with 128 fibres.
Figure 12B:
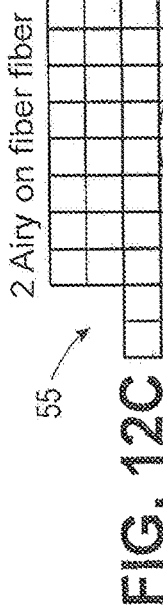
FIG. 12B shows sampling of the detection light and binning with one Airy imaged on 128 fibres.
Figure 12D:
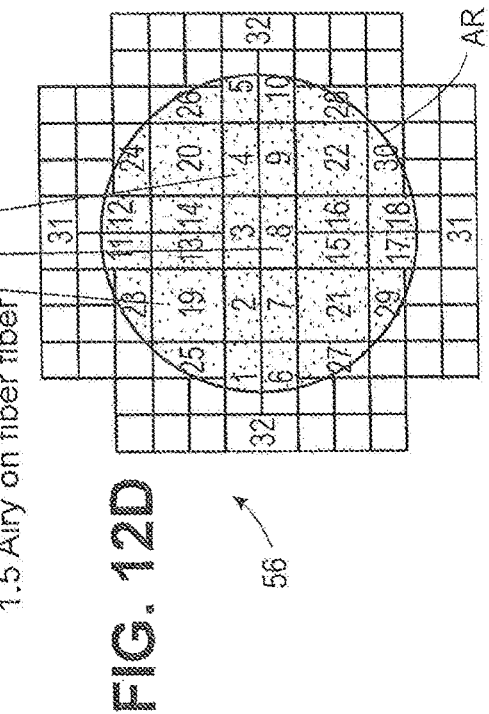
FIG. 12D shows sampling of the detection light and binning with 1.5 Airys on the 128 fibres.
Figure 12C:
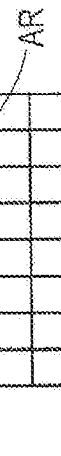
FIG. 12C shows sampling of the detection light and binning with two Airys on the 128 fibres.

For the case where precisely 1 Airy falls on the fiber bundle, 4 channels, by way of example, are each combined in electronics which are near to the detector (FPGA or a microcontroller), such that the combined channels have the known arrangement (FIG. 12B). For the case in which exactly 2 Airys are imaged by the fiber bundle, only the inner 32 channels are read out (FIG. 12C). For intermediate values, a matching configuration must be found depending on the size of the Airy disk on the fiber bundle, said configuration combining fibers into one channel in order to achieve an increase in resolution in each lateral direction. An interpolation in the FPGA to, for example, 32 channels is likewise possible. FIG. 12D) shows one example for the named situation.

As an alternative to the redistribution of the measurement signals, as in FIG. 12D, where each fiber is functionally assigned to exactly one channel, it is possible to distribute the D signals of one fiber to multiple channels in a FPGD, for example by means of algorithms which are known in the art for the scaling of images.

Fiber inputs 53 are illustrated by way of example in FIG. 12A, wherein substantially one detector element 1-128 on the detector array is functionally assigned to each of these fiber inputs 53.

A combination of the signals of multiple detector elements is illustrated in FIG. 12B using fiber inputs 54 which are combined into 32 segments, functionally assigned to the individual fibers for 32 generated detection signals. This enables a reduction of the detection channels for the illustrated Airy diameter of the light spot AR.

As a result, it is advantageously possible to reduce the data transmission rate without transmission losses.

In FIG. 12C, the Airy diameter AR (see FIG. 11) is smaller by a factor of 2, and is therefore scanned by a smaller number of fiber input ends.

In this case as well, only the detected inner channels are read out—in this case the inner 32 from FIG. 12A.

The AR [Airy disk] in FIG. 12D is smaller than the fiber bundle by a factor of 1.5.

In this case, differently sized individual segments SG are used to illustrate that a different binning of read detection signals can also be carried out, by combining different numbers of fibers being combined into differently sized segments SG.

The different combination of the detection channels of the associated individual detectors of the detector array 56 via the optical fibers, as illustrated in FIGS. 12B-D, can advantageously be carried out at the same time as—or prior to or after—an adaptation of the Airy diameter of the light spot by an adjustment via a variable lens 50. And an optimization process is carried out via a regulating loop, as described in FIG. 11, using the captured signal or the generated sample image, based on the criteria (contrast, etc.) described above.

The combination of the detection channels also constitutes an advantageous alternative to the adaptation by means of a variable lens 50.

In this case, an exchange of the fiber bundles, as in FIGS. 9, 10, can additionally take place, and the optimization of the signal and/or image capture can also be carried out for this exchange.

This is performed, by way of example, by comparing each of multiple images of the sample, or of a test sample, captured under different conditions.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope for high resolution scanning microscopy of a sample comprising:
    an illumination device for illuminating the sample, an imaging device for scanning at least one point or linear spot across said sample and of imaging said point or linear spot into a diffraction-limited, static single image having a size,
    a detector device detecting said single image in a detection plane for various scan positions,
    an evaluation device for evaluating a diffraction structure of said single image for said scan positions, using data from said detector device, and generating an image of said sample which has a resolution which is enhanced beyond a diffraction limit,
    said detector device including a detector array which has pixels and a size which is larger than said single image, and
    a closed-loop circuit configured to perform an adjustment by adjusting a zoom lens/focusing lens to adapt the size of said single image to the size of said detector array using a feedback signal, and interconnecting individual pixels of said detector array using a feedback signal, said adjustment including image contrast and image sharpness and signal-to-noise ratio as a control variable.

2. The microscope according to claim 1, further comprising multiple non-imaging redistribution elements arranged in front of said detector array between said detector array and said detection plane, which one at a time distribute radiation emanating from said single image in said detection plane onto said pixels of said detector array in a non-imaging manner,
    said multiple redistribution elements being fiber bundles which differ in number of the fibers and arrangement of the fibers and fiber diameters and shape of the fiber cross-section, at least two optical fibers from different redistribution elements of said multiple redistribution elements ending at the same pixel of said detector device, and said redistribution elements being arranged in a manner allowing pivoting or sliding them into an optical axis detecting sample light.

3. The microscope according to claim 2, wherein said redistribution element comprises a bundle of optical fibers of multi-mode optical fibers, which has an input arranged in said detection plane, and an output where the optical fibers end at said pixels of said detector array in a geometric arrangement which differs from that of said input.

4. The microscope according to claim 2, wherein said optical fibers run from said input to an output in such a manner that optical fibers which are adjacent said output are also adjacent said input, in order to minimize a radiation intensity-dependent crosstalk between adjacent pixels.

5. The microscope according to claim 2, wherein said redistribution element has a mirror, said mirror having different mirror elements comprising a multi-faceted mirror, a Digital Micromirror Device (DMD), or an adaptive mirror, which deflects radiation from said detection plane onto said pixels of said detector array, wherein said pixels of said detector array have a geometric arrangement which differs from that of said mirror elements.

6. The microscope according to claim 1, wherein said imaging device has a zoom lens arranged in front of said detection plane in the imaging direction matching the size of said single image to that of said detector device.

7. The microscope according to claim 6, wherein said illumination device and said imaging device share a scanning device such that said illumination device illuminates said sample with a diffraction-limited point- or linear spot which coincides with said spot imaged by said imaging device, wherein said zoom lens is arranged in such a manner that it is also a component of the illumination device.

8. The microscope according to claim 1, wherein said detector array is a detector row.

9. The microscope according to claim 1, further comprising:
    for at least a part of said pixels of said detector array, radiation from at least two redistribution elements is functionally assigned to each individual pixel, said redistribution elements being arranged in a manner allowing pivoting or sliding into an optical axis detecting sample light,
    a number of the individual signals of the detector array being reduced by interconnecting individual pixels in said signal evaluation,
    said detector pixels being only read out in regions which are at least illuminated with sample light,
    selective channels being read out and are combined for further processing in an evaluation circuit which is connected downstream of the detector array by a Field Programmable Gate Array (FPGA) or a microcontroller.

10. The microscope according to claim 1, wherein said detector row is an Avalanche Photodetector (APD) row.

11. The microscope according to claim 1, wherein said detector row is a photomultiplier tube (PMT) row.

12. A method for high resolution scanning microscopy of a sample, comprising:
    illuminating a sample,
    guiding at least one point or linear spot over said sample in a scanning manner so that it is imaged into a single image having a size, detecting said single image for various different scan positions such that a diffraction structure of said single image is detected, evaluating, said diffraction structure of said single image for each scan position and generating an image of said sample which has a resolution which is enhanced beyond the diffraction limit, a detector array being included which comprises pixels and which has a size that is larger than said single image, and adjusting a zoom lens/focusing lens to adapt said size of said single image to said size of said detector array using a feedback signal, and interconnecting individual pixels of said detector array using a feedback signal, the adjustment including image contrast and image sharpness and signal-to-noise ratio as a regulation parameters control variable.

13. The method according to claim 12, further comprising selectively redistributing radiation emanating from said single image in said detection plane on said pixels of said detector array in a non-imaging manner by pivoting or sliding a selected one of multiple redistribution elements, located in front of said detector array between said detector array and said detection plane, into said optical axis detecting sample light, and said multiple redistribution elements being fiber bundles which differ in numbers of fibers and arrangement of said fibers and fiber diameters and shape of the fiber cross-section, of which at least two optical fibers from different redistribution elements of said multiple redistribution elements end at individual pixels.

14. The method according to claim 13, wherein said radiation of said single image is redistributed by means of a bundle multi-mode optical fibers, which has an input arranged in the detection plane, and an output where the optical fibers end at said pixels of said detector array in a geometric arrangement which differs from that of said input.

15. The method according to claim 14, wherein said optical fibers run from said input to said output in such a manner that optical fibers which are adjacent said output are also adjacent said input, in order to minimize a radiation intensity-dependent crosstalk between adjacent pixels.

16. The method according to claim 14, wherein said bundle of optical fibers and said detector array are calibrated, by each optical fiber individually receiving radiation, by interference signals in pixels which are associated with optical fibers which are adjacent thereto at said output being detected, and by a calibration matrix being established, by means of which a radiation intensity-dependent crosstalk between adjacent pixels is corrected in subsequent microscopy of the sample.

17. The method according to claim 14, wherein said radiation of said single image is redistributed by means of a mirror, said mirror having differently inclined mirror elements wherein radiation from said detection plane is directed by said mirror onto pixels of said detector array, and wherein said pixels of the detector array have a geometric arrangement which differs from that of said mirror elements.

18. The method according to claim 12, wherein said detector array is a detector row.

19. The method according to claim 12, further comprising determining a direction of movement of scanning of said point or linear spot by signals of individual pixels of said detector array being evaluated by means of cross-correlation.

20. The method according to claim 12, further comprising detecting changes in said sample by means of determining and evaluating a chronological change in said diffraction-limited single image for said point- or linear spot which is stationary in said sample.

21. The method according to claim 12, further comprising:

functionally assigning, for at least a part of said pixels of said detector array, radiation from at least two redistribution elements to each of said individual pixels, said redistribution elements being fiber bundles which differ in number of fibers and arrangement of said fibers and fiber diameters and shape of the fiber cross-section, arranging said redistribution elements in a manner allowing pivoting or sliding into said optical axis detecting sample light, reducing said number of said individual signals of said detector array reduced by interconnecting individual pixels in said signal evaluation, said detector pixels only being read out in regions which are at least illuminated with sample light, making an adjustment in a closed-loop circuit by changing redistribution elements, and adjusting a zoom lens/focusing lens to adapt image sizes, and interconnecting individual pixels of said detector array using a feedback signal, said adjustment including image contrast and image sharpness and signal-to-noise ratio as a control variable, and wherein selective channels are read out and are combined for further processing in an evaluation circuit which is connected downstream of said detector array by a Field Programmable Gate Array (FPGA) or a microcontroller.

22. The method according to claim 17, wherein said mirror is a multifacet mirror.

23. The method according to claim 17, wherein said mirror is a Digital Micromirror Device (DMD).

24. The method according to claim 17, wherein said mirror is an adaptive mirror.

25. The method according to claim 18, wherein said detector row is an Avalanche Photodetector (APD).

26. The method according to claim 18, wherein said detector row is a photomultiplier tube (PMT) row.

* * * * *